United States Patent [19]

Pocholle et al.

[11] Patent Number: 5,138,628
[45] Date of Patent: Aug. 11, 1992

[54] POWER LASER WITH ACTIVE MIRROR

[75] Inventors: Jean-Paul Pocholle, Arpajon/la Norville; Michel Papuchon, Massy, both of France

[73] Assignee: Thomson-CSF, Puteaux, France

[21] Appl. No.: 689,372

[22] Filed: Apr. 22, 1991

[30] Foreign Application Priority Data

May 2, 1990 [FR] France ................. 90 05539

[51] Int. Cl.$^5$ ................................. H01S 3/08
[52] U.S. Cl. .................... 372/99; 372/43; 372/92; 372/97
[58] Field of Search ............ 372/99, 69, 70, 49, 372/92, 97, 39, 43

[56] References Cited

U.S. PATENT DOCUMENTS

| | | | |
|---|---|---|---|
| 4,800,568 | 1/1989 | Krueger et al. | 372/99 |
| 4,856,019 | 8/1989 | Miyata et al. | 372/99 |

OTHER PUBLICATIONS

Electronics Letters, vol. 24, No. 4, Onta et al. "All-Optical Active . . . " pp. 216-217.
Applied Physics Letters, vol. 50, No. 18, May 1987, Gourley et al. "Visible, Room . . . " pp. 1225-1227.
Electronics Letters, vol. 24, No. 10, May 1988, J. Faist et al. "Optically Pumped GaAs . . . " pp. 629-630.
Applied Physics Letters, vol. 51, No. 23, P. L. Gourley et al., "Optical Bleaching in an Epitaxial . . . " pp. 1395-1397.
Applied Physics Letters, vol. 51, No. 23, G. W. Yoffe et al. "Modulation of Light By . . . " pp. 1876-1878.

*Primary Examiner*—James W. Davie
*Attorney, Agent, or Firm*—Roland Plottel

[57] ABSTRACT

The disclosure relates to the making of lasers. It is sought to obtain a laser that emits at only one frequency without using frequency selection means (such as filters, etc.) needed in certain types of spectral wideband lasers (vibronic type lasers for example). It is also sought to make the laser tunable by simple means. To achieve these goals, it is proposed to define a laser cavity in which one of the mirrors is not a standard mirror but a mirror with an active function in the sense that it does not merely reflect light but itself produces light at only one wavelength. The active mirror is preferably a Bragg reflector made with an alternation of layers, at least one of which is a semiconductor layer. This layer collects electron-hole pairs in response to the excitation by the fluorescence photons. It re-emits photons at a wavelength determined by the forbidden band width of the semiconductor. The choice of the types of composition and thicknesses of the layers is contrived so that there is coincidence between the re-emitted wavelength and a peak of reflectivity of the Bragg mirror. The laser may be made tunable by the appropriate positioning of a mirror region having a peak of reflectivity at a desired frequency.

16 Claims, 4 Drawing Sheets

POWER LASER WITH ACTIVE MIRROR

BACKGROUND OF THE INVENTION

1. Field of the Invention

The invention concerns lasers and, more particularly, power lasers.

With reference to FIG. 1, it is recalled that a laser is generally constituted by an amplifier medium 10 placed in a cavity, the ends of which are constituted by mirrors M1 and M2, one of them (the output mirror M2) being partially transparent to the wavelength emitted by the laser.

The amplifier medium 10 has active ions that may be excited by a pumping source 12 (which is often an auxiliary pumping laser). This source has the function of exciting the electrons of the active ions from a particular energy level to a higher level from which they may fall back, directly or indirectly, to the first level, in emitting photons at a determined wavelength or in a determined range of wavelengths, and with phase coherence.

An aim of the invention is to improve the possibilities of making lasers, notably with respect to the way in which the amplifier medium is excited, either to facilitate emission at a well-determined frequency or to make the emission frequency tunable by simple means.

2. Description of the Prior Art

It may be pointed out that the defects of presently existing power lasers include, for example, the fact that they have several resonance modes so that they tend to emit several wavelengths, some of which are undesirable. Ancillary means (birefringent filters, references, etc.) are therefore required to eliminate these wavelengths, and these means result in an increase in the complexity of the laser, and in a loss of power when the elimination is done by filtering.

It can also be pointed out that, to obtain a tunable laser (whether or not it is a power laser), it is generally necessary to use filters, with temperature adjustment means in order to carry out the tuning. These too are means that are complicated and generate power losses.

SUMMARY OF THE INVENTION

The invention proposes a new laser structure that enables the improvement of the possibilities and the performance characteristics of lasers, either to facilitate emission at a well-determined frequency or to make this frequency tunable.

According to the invention, there is proposed a laser including an amplifier medium, a pumping source to excite the amplifier medium and produce fluorescence photons, and two mirrors defining a cavity containing the amplifier medium, wherein at least one of the mirrors is an active mirror producing light at a determined wavelength in response to an excitation by the fluorescence photons of the amplifier medium.

Thus, even if the amplifier medium tends to emit photons at different wavelengths, there will be a preferred stimulated emission wavelength, the one that corresponds to the emission by the active mirror.

Preferably, according to the invention:

1) the active mirror is a Bragg reflector constituted by a repeated stacking of alternating layers with different optic indices and with thicknesses chosen so as to ensure a peak of reflectivity perpendicularly to the mirror, for the desired laser emission wavelength, and 2) at least one of the layers of the alternation is a semiconductor layer having a radiative transition energy (in practice it will most commonly be the forbidden band energy) corresponding substantially to the desired laser emission wavelength, and a forbidden band energy that is lower than or equal to the energy of the fluorescence photons so that said layer absorbs a part of the fluorescence photons emitted by the amplifier medium.

This laser structure is essentially a structure where one of the mirrors is, so to speak, formed as a very small semiconductor laser, the cavity of which is constituted by the stacking of the layers of the Bragg reflector. This laser minidiode (with a very short cavity) is excited by fluorescence photons coming from the amplifier medium excited by the pumping source. It emits at a frequency characteristic of a radiative energy transition of the semiconductor used, and this frequency is located precisely in the peak of reflectivity of the mirror and, at the same time, in a resonance zone of the minicavity constituted by the stacking of layers. There is therefore a stimulated emission of coherent light by the mirror itself, in a direction perpendicular to the mirror, hence towards the amplifier medium which then, itself, also emits a stimulated emission, at the wavelength for which the resonance of the cavity is the maximum, i.e. at the wavelength corresponding to the peak of reflectivity of the Bragg reflector.

The mirror used at one end of the cavity is therefore an active mirror and not a passive mirror: it does not merely reflect light but emits light itself, and even coherent light.

Since the Bragg reflector (which may herein be called a mirror-laser since it fulfils the functions of both a mirror and a laser) constitutes a very thin laser cavity, it can resonate on only one mode. The mirror-laser is therefore a single-frequency coherent source and the amplifier medium of the main laser will itself emit at one and only one frequency.

Among the major advantages of the invention, we might cite:

the ease of emission at a well-determined frequency, even for the lasers having several longitudinal modes of resonance, and specially for the vibronic type power lasers, the possibility of having a laser that is tunable in a narrow band by the simple mechanical shifting of the mirror-laser, as shall be explained further below.

BRIEF DESCRIPTION OF THE DRAWINGS

Other features and advantages of the invention shall appear from the following detailed description, made with reference to the appended drawings wherein.

DETAILED DESCRIPTION OF THE INVENTION

Figure 1:
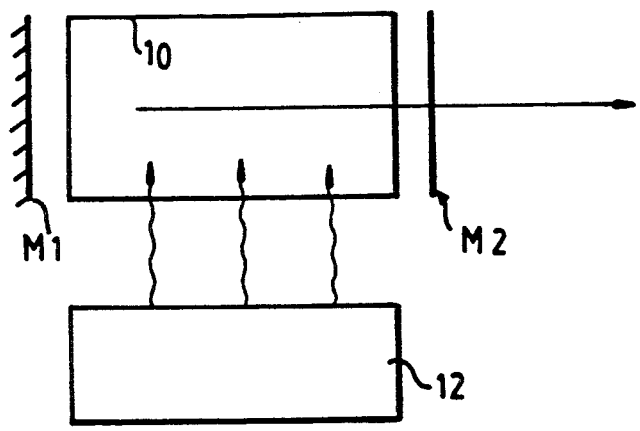
FIG. 1 shows a schematic view of the standard constitution of a laser.
Figure 2:
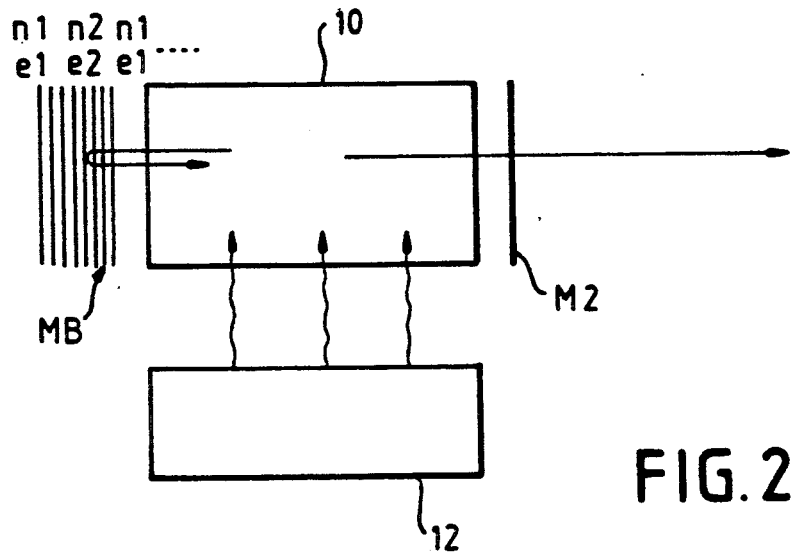
FIG. 2 shows a schematic view of the general structure of a laser according to the invention.

FIG. 2 shows the general structure of the laser according to the invention: one of the mirrors defining the cavity of the laser, in this example the mirror M1 which is not the output mirror is replaced by a Bragg reflector MB.

The reflector is a stacking of alternating layers with optic indices n1 and n2 and respective thicknesses e1 and e2. The alternation of n1, e1 and then n2, e2 is repeated a great many times (for example several tens of times) to enable the obtaining of a peak of reflectivity, the tip of which represents a coefficient of reflection of at least 90% to 95%.

The wavelength $L_o$ at which the maximum of this of reflectivity is located is:

$$L_o = 2(n1 e1 + n2 e2)$$

The thicknesses are measured perpendicularly to the surface of the mirror so that the computed wavelength corresponds to a maximum of reflectivity perpendicularly to the mirror.

It will be noted that, in certain cases, several main separated peaks of reflectivity may be desired and, in this case, the alternation of layers with different indices may be more complex than a simple (n1,e1)/(n2,e2) alternation. For example, from time to time, a third layer n3,e3 will be interposed in the alternation. Or, again, the alternation will be a regular ternary (n1,e1)/(n2,e2)/(n3,e3) alternation etc.

However, the rest of the description shall be limited to an explanation of the invention with reference to a simple binary (n1,e1)/(n2,e2) alternation leading to only one main peak of reflectivity.

Figure 3:
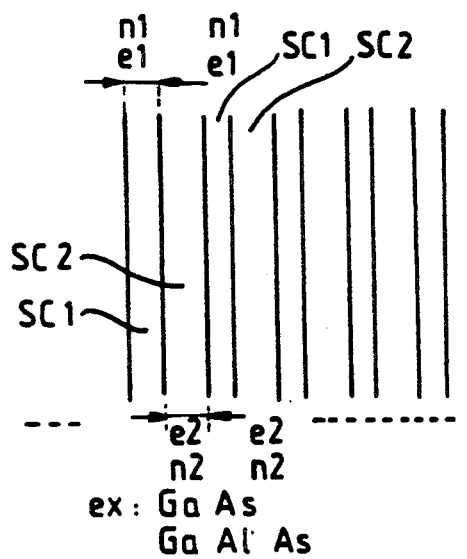
FIG. 3 shows the constitution of the mirror-laser closing one end of the cavity of the main laser.

According to the invention, the alternating layers of the Bragg reflector, shown in enlarged detail in FIG. 3, are made of semiconductor materials; or, at any rate, one of the layers is made of a semiconductor material. In practice, both layers are semiconductor layers for reasons of ease of fabrication, and this is why FIG. 3 shows a regular alternation of a first semiconductor material SC1 (index n1, thickness e1) and a second semiconductor material SC2 (index n2, thickness e2). It will be assumed that the material that is necessarily semiconductive is the material SC1.

Figure 4:
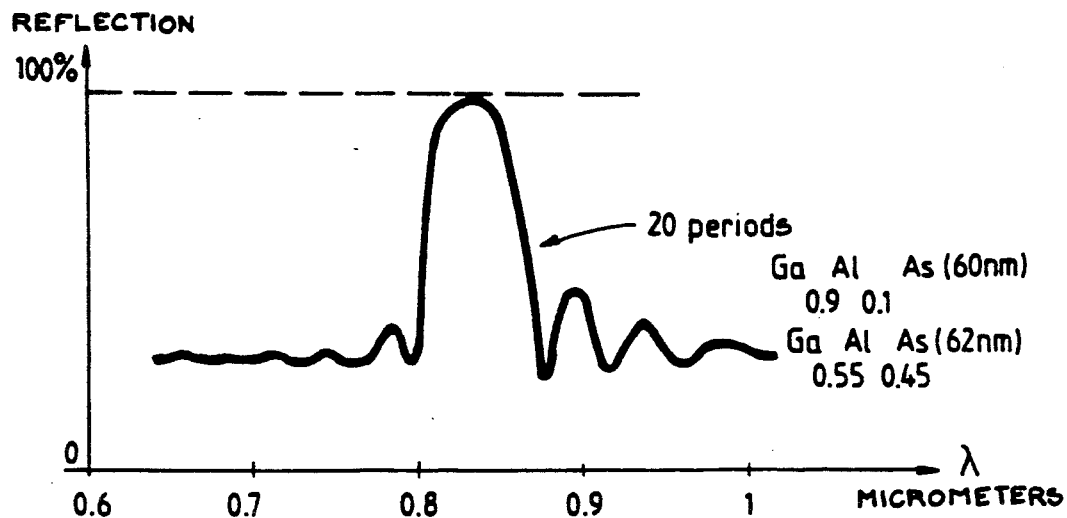
FIG. 4 shows a curve of reflectivity of a mirror with alternating semiconductor layers based on gallium-aluminium arsenide with two different types of composition.

FIG. 4 exemplifies the peak of reflectivity obtained by means of gallium-aluminium arsenide based layers having the following composition: $Ga_{0.9}Al_{0.1}As$ (60 nanometers) and $Ga_{0.55}Al_{0.45}As$ (62 nanometers). The stacking is one of 20 periods. The peak obtained has a wavelength of 830 nanometers and rises to 94%.

By increasing the number of periods, the latter figure is increased; with 30 periods, 98% is reached.

The semiconductor material SC1 is a material with an electronic structure that meets two criteria:

first of all, this structure is such that the electrons may be excited in higher energy levels by the fluorescence photons emitted by the amplifier medium of the laser. This means that, in general, for a standard semiconductor SC1, its forbidden band width, between the valence band and the conduction band, is smaller than the energy of these fluorescence photons. For semiconductor materials with multiple quantum wells, the condition may be expressed differently, but in any case the electrons should be capable of being excited at higher energy levels by the fluorescence photons;

then, the semiconductor is such that the excited electrons can return simultaneously or in a stimulated way to a lower level, by a radiative transition, i.e. in emitting photons at a well-determined wavelength related to the difference in levels of energy of the transition;

and, finally, the wavelength of these photons emitted by the semiconductor material SC1 should be precisely located in the peak of reflectivity of the Bragg reflector (not necessarily at the top of the peak but in the peak).

In practice, for standard massive semiconductors, the radiative transition is quite simply a return of the electrons from the conduction band, where they were excited, to the valence band, and the radiative transition energy is then simply the energy corresponding to the forbidden band. However, there are cases where the energy of the radiative transition during the return of the electrons is not a forbidden band energy (in the case of multiple quantum well semiconductors).

The second material SC2 is not necessarily semiconductive: all that is required is that it should be transparent to the wavelengths of the fluorescence photons that come and excite the electrons of the semiconductor SC1 and that it should have an optic index different from that of the material SC1. Besides, the maximum reflection coefficient of the reflector MB is all the higher as the difference in indices $n2-n1$ is greater so that, if this difference is sufficient, it is enough to have a moderate number of spatial periods in the stacking of alternating layers (20 or 30 for example).

Besides, it will be noted that the spectral width of the peak of reflectivity increases with the difference in indices since the spectral width at mid-height of the peak is proportional to $(n1-n2)/(n1+n2)$.

It is worthwhile for the peak of reflectivity to have a substantial spectral width if the laser has to be tunable in frequency. This point shall be explained further below. In the example of FIG. 4, it is seen that this width (the width of the peak at mid-height) is of the order of 50 nanometers.

Should the main laser have to be a strictly single-frequency laser, it would be preferable to have a smaller bandwidth, hence a smaller difference between indices $n2-n1$ and a larger number of pairs of layers in the reflector.

To make it easy to understand the working of the laser according to the invention, we shall choose a precise example, while bearing in mind the fact that the invention is applicable to a large number of cases, for a very wide variety of ranges of wavelengths, for example in the ultra-violet as well as in the visible and infrared regions.

It is assumed that the laser is a pulsed power laser, the amplifier medium of which is a sapphire crystal doped with trivalent titanium ($Ti^{3+}:Al_2O_3$).

The trivalent ion $Ti^{3+}$ has the specific feature of emitting a fluorescence ranging from 0.65 micrometers to 1.1 micrometers in pulsed mode.

To make the Bragg reflector MB, an alternation of two semiconductor materials SC1 and SC2 with two different types of composition is chosen: these are, respectively, gallium arsenide and gallium-aluminium arsenide.

SC1: GaAs, thickness e1 = 64 nanometers;
SC2: $Ga_{0.55}Al_{0.45}As$, thickness = 63 nanometers.
There are 25 spatial periods in the stacking.

Figure 5:
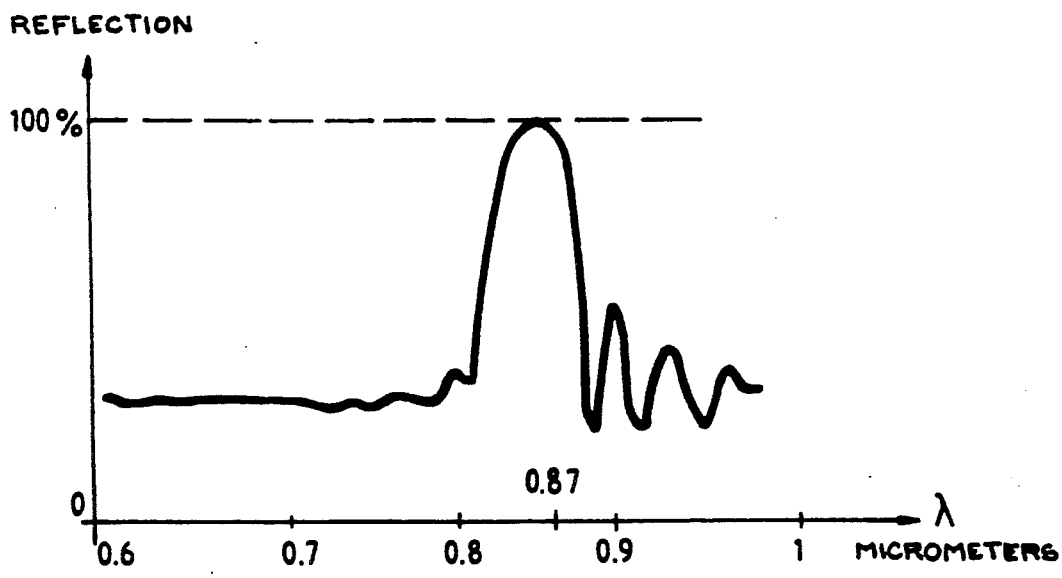
FIG. 5 shows another curve of reflectivity, with types of composition adjusted so that the peak of reflectivity is located at a wavelength that is very close to the wavelength of transition of the forbidden band of one of the layers.

The curve of reflectivity as a function of the wavelength is given in FIG. 5. The thicknesses e1 and e2 have been chosen as a function of the optic indices of the materials to obtain a peak centered on the wavelength $L_0=0.87$ micrometers. The maximum of the peak is very close to 100%.

This choice of $L_0$ is made because the excited semiconductor SC1 is capable of spontaneous emission at a wavelength close to 0.87 micrometer by the recombination of the electron-hole pairs during the excitation. Indeed, the forbidden band width of the gallium arsenide GaAs of the layer of SC1 is 1.424 eV.

Besides, it must be recalled that the second material SC2 of the reflector is chosen so that it is transparent to a large part of the fluorescence radiation of the ion $Ti^{3+}$, and also so that it has an optic index $n_2$ that is sufficiently different from $n_1$.

In the case of a semiconductor material such as gallium-aluminium arsenide, the problem is easily resolved since the optic index is related to the forbidden band width.

By choosing a semiconductor material SC2 with a forbidden band width greater than that of the semiconductor material SC1, the desired dual result is obtained: the index $n_2$ is different from $n_1$ (it is smaller) and the material SC2 is transparent to the wavelengths absorbed by the material SC1 (between 0.65 micrometers and 0.87 micrometers). In fact, the material chosen in this example is transparent practically to the entire spectrum of fluorescent photons emitted by the amplifier medium (0.65 micrometers to 1.1 micrometers).

The laser works as follows: the pumping source (flash-lamp or pumping laser in general) excites the ions of trivalent titanium which, by spontaneous fluorescence, emit photons in the 0.65 to 1.1 micrometer spectral band.

These photons go through the transparent layers of gallium-aluminium arsenide SC2. Some of them also go through the layers of gallium arsenide SC1. These are the photons in the roughly 0.9 to 1.1 micrometer spectral band. But the photons emitted between 0.65 and 0.87 micrometers are absorbed by the layers of SC1. They produce large quantities of electron-hole pairs.

By recombination, the electron-hole pairs generate a photon emission in the vicinity of the 0.87 micrometer wavelength, since this wavelength corresponds to the forbidden band energy of the semiconductor SC1 wherein these pairs have collected.

For this wavelength of about 0.87 micrometers, the stacking of layers of the Bragg reflector constitutes a resonant cavity since it is located fully in the peak of reflectivity. There is then stimulated laser emission within the Bragg stacking itself, at a frequency determined by the peak of reflectivity of the curve of FIG. 5.

Thus whereas, seen from the amplifier medium side, the Bragg reflector behaves like a mirror that is selective at 0.87 micrometers, seen from inside the mirror it behaves like a laser cavity at the same frequency, with an optically excited semiconductor amplifier medium.

The Bragg reflector with semiconductor SC1 layer therefore behaves like a mini-laser at the wavelength for which the main cavity of the laser (between the mirror MB and the output mirror) will be resonant (the resonance due to the peak of reflectivity of one of the mirrors of the cavity).

The photons of coherent light generated i the Bragg reflector emerge partly towards the main amplifier medium 12 and therein stimulate the emission of a coherent light at the same wavelength.

An interesting point to be noted is that the very small thickness of the Bragg reflector (with 25 stackings of pairs of layers of about 60 nanometers, giving about 3 micrometers) prevents there being several resonance modes. There is therefore only one wavelength emitted from the reflector to the main amplifier medium and only one wavelength stimulated in this medium.

It is no longer necessary to provide for a wavelength selection filter in the cavity.

Figure 6:
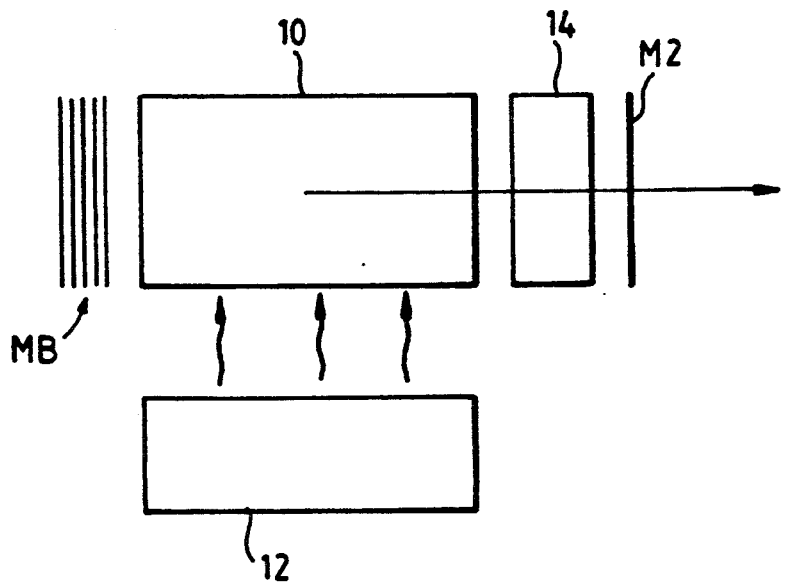
FIG. 6 shows another embodiment of the invention.

In practice, the laser will be made to work in pulse mode by means of an optic modulator incorporated into the main cavity. The modulator 14, shown in FIG. 6, is used to block the output of the laser beam for a time. The fluorescence photons of the amplifier medium therefore all contribute to increasing the quantity of electron-hole pairs generated in the semiconductor material SC1 of the Bragg reflector. When the modulator is turned on, the conditions of resonance appear and enable the release of the stimulated emission. Thus, high power laser pulses can be provided for a period shorter than the period of excitation by the pumping source (this excitation is itself generally pulsed since the fluorescence of the trivalent titanium ion occurs in relaxed mode).

A case may be envisaged where the mirror-laser or active mirror MB is the output mirror of the main laser cavity, or where the two mirrors M1 and M2 of the standard lasers are replaced by semiconductor-based Bragg mirrors according to the invention.

Should the output mirror be a semiconductor-based Bragg mirror, it should be seen to it that the peak of reflectivity obtained by this mirror corresponds to an acceptable value (for example, 95% at the tip of the peak) enabling the output of the laser beam.

The foregoing description has referred to semiconductor layers within the Bragg mirror. This concept will encompass non-massive layers and, especially, multiple quantum well structures (local modifications in structure are created in a layer to set up energy levels of electrons that do not exist naturally in the layer and that enable particular transitions). More generally, this concept will encompass all the structures of layers that are optically excitable (by the fluorescence photons of the amplifier medium) and are capable of releasing photons at a wavelength corresponding to a peak of reflectivity of the alternation of layers of the reflector. The recombinations that occur to emit these photons may then quite possibly be located within a valence or conduction band rather than between two bands.

Naturally, the invention would be applicable when the pumping source of the main amplifier medium is other than an optic source. There is a known way of achieving the excitation with an electric current (semiconductor lasers) and the photons emitted under the effect of this electric pumping are then called luminescence photons rather than fluorescence photons, without in any way thereby changing the principle of the invention.

Figure 7:
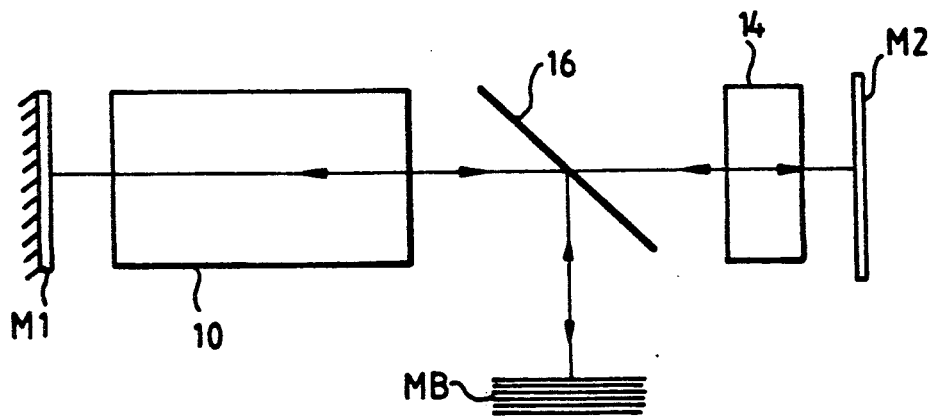
FIGS. 7, 8 and 9 show further alternative embodiments.

FIG. 7 shows an alternative embodiment wherein the main cavity of the laser includes not two but three mirrors M1, M2 and MB with, in addition, a semi-transparent plate 16.

The mirrors M1 and M2 face each other and define a first cavity of the laser, containing the amplifier medium 10.

M1 is conventionally the mirror with the maximum coefficient of reflection (for the laser wavelength and for all the wavelengths of fluorescence that may possibly be emitted). M2 is the output mirror with a slightly lower coefficient of reflection. The separating plate 16, in the path of the photons between the parallel mirrors M1 and M2, directs a portion of the photons towards the Bragg reflector MB so that a second laser cavity containing the amplifier medium 10 is defined. This cavity includes the mirror M1 and the separating plate 16, and ends in the reflector MB.

This arrangement enables the Bragg reflector to be dissociated from the other mirrors, but its working of exactly the same. A fraction of the fluorescence photons emitted by the amplifier medium is directed by the plate 16 towards the reflector MB, and excites the semiconductor layers of this reflector MB. A laser emission is generated in the mirror-laser MB at a wavelength defined by the semiconductor material SC1 of this mirror. This wavelength is sent on by the separator plate 16 to stimulate an emission at the same wavelength in the amplifier medium that has been amplified beforehand. The ratio between the reflection coefficient and the transmission coefficient of the separator plate 16 enables the quantity of energy transmitted to the Bragg reflector MB to be adjusted.

Figure 8:
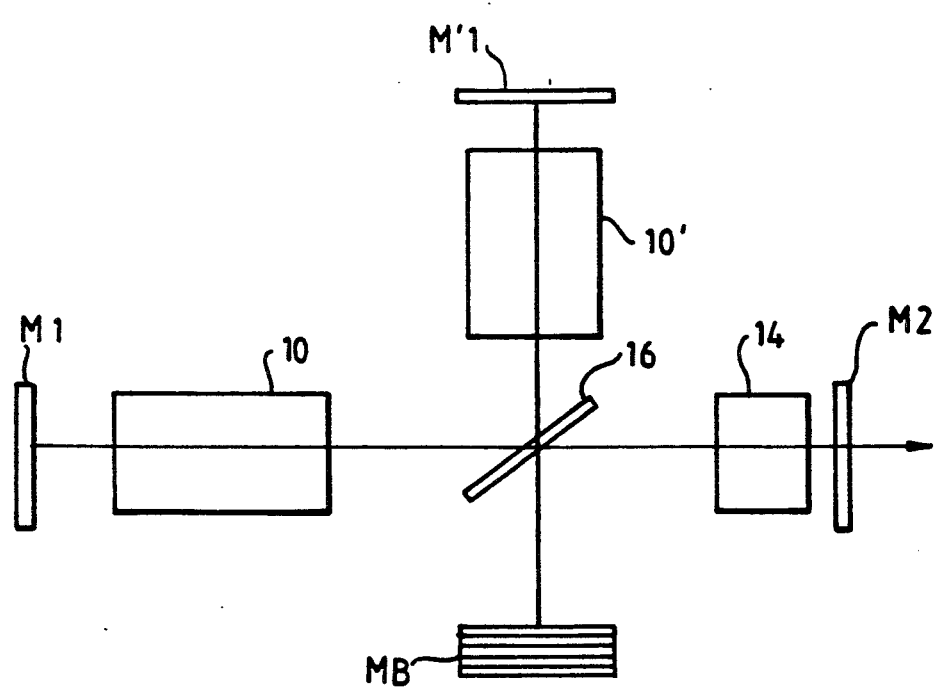
Figure 9:
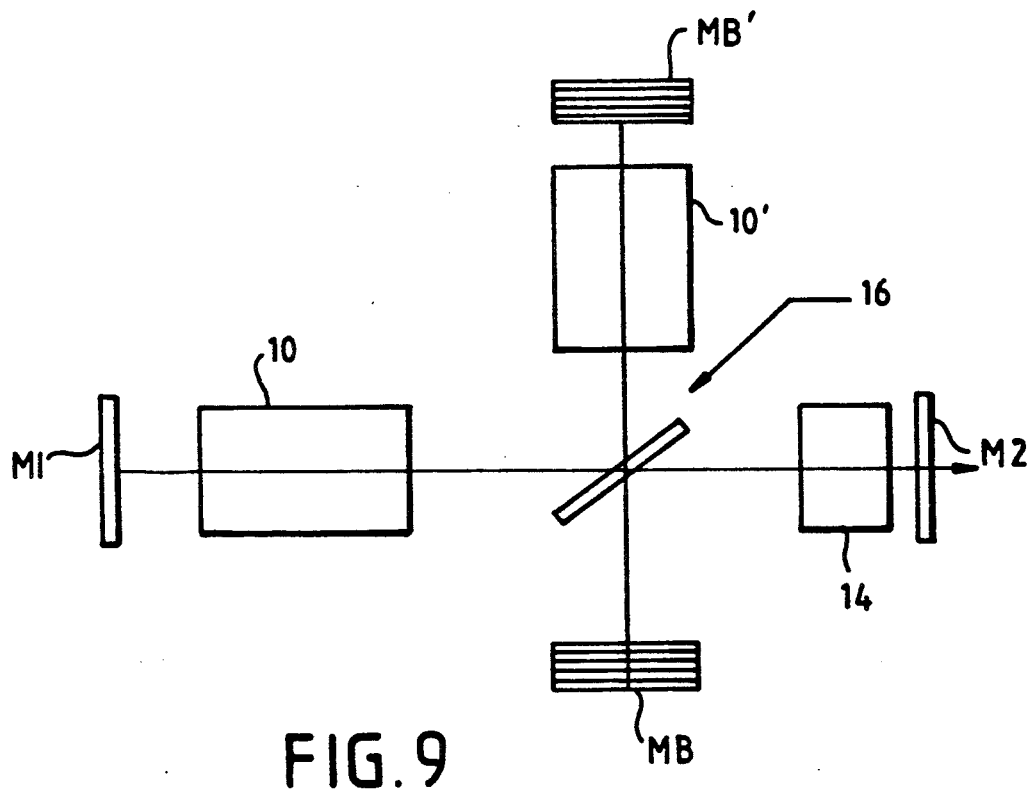

Other alternative embodiments are shown in FIGS. 8 and 9.

The variant of FIG. 8 uses two amplifier media 10 and 10' in respective cavities that respectively end in perpendicular mirrors M1 and M'1. The beams of the two cavities are combined through a semi-reflecting slantwise plate 16. This twofold amplification enables the overall power of the laser to be increased. M2 is still the output mirror. In this example, the Bragg reflector is positioned perpendicularly to the output mirror M2 but it could be replaced by a standard mirror with a very high coefficient of reflection and the mirror M1 and M'2 would then be replaced by a semiconductor-based Bragg reflector.

In the variant of FIG. 8, there are again two resonating cavities joined by a semi-reflecting plate as in FIG. 8, and one of the cavities is demarcated by two semiconductor-based Bragg mirrors MB and MB' while the other cavity is demarcated by standard mirrors M1 and M2.

The laser according to the invention can be applied not only to power lasers in order to obtain a single frequency of emission without complex filters, but also to make frequency tunable lasers.

For, it has been seen that the laser emission wavelength is related to the conditions of reflectivity of the Bragg mirror and that these conditions depend a great deal on the thicknesses e1 and e2 of the alternating layers of the mirror since the peak of reflectivity is located at a wavelength $L_o$ such that:

$$L_o = 2(n_1 e_1 + n_2 e_2)$$

It is then possible to make a laser in which several Bragg mirrors are interchangeable to close the cavity of the main laser by a mirror chosen according to the frequency desired. The frequency is dictated by the peak of reflectivity of the mirror considered, and this peak of reflectivity is related to the thicknesses of the layers SC1 and SC2.

It is also possible to obtain a continuously tunable laser if the mirror is not uniform, i.e. if the thicknesses of the layers vary along the surface of the mirror. Besides, it is possible to achieve variation in the thicknesses of deposits of semiconductor layers quite simply by setting up temperature gradients of the substrate during the operation for the vapor deposition of the layers on the substrate. The laser is then continuously tunable by the mechanical shifting of the Bragg mirror so that a portion of mirror having a peak of reflectivity at the desired wavelength is brought before the cavity (more precisely before that part of the amplifier medium that is excited by the pumping laser).

For example, the wavelengths for two structures that differ from each other both in thickness and in composition, have been evaluated as follows:

A):
first layer GaAs thickness 60 nanometers
second layer $Ga_{0.55}Al_{0.45}As$, 63 nm
the forbidden band width is 1.424 eV and corresponds to 0.87 micrometers.

B):
first layer $Ga_{0.95}Al_{0.05}As$, 61 nm
second layer $Ga_{0.55}Al_{0.45}As$, 60 nm
the forbidden band width is 1.482 eV and the emission is at 0.836 micrometers.

In the case of power lasers made of sapphire doped with trivalent titanium, the semiconductor alloys of the Bragg reflector will preferably be gallium-aluminium arsenide based compounds with different types of composition, making it possible to obtain forbidden band widths corresponding t emission wavelengths of about 0.7 to 0.87 micrometers.

Should shorter wavelengths (0.6 to 0.7 micrometers for example) be desired, alternations of layers of gallium-aluminium arsenide and calcium-strontium fluorides could be used. These fluoride layers are dielectric and transparent in the visible region. The index of calcium-strontium fluoride is far smaller than that of gallium-aluminium arsenide and the spectral width of the peak of selectivity ma be far greater.

The fluorinated compound may also be doped with a rare earth: this enables the making of a mirror-laser that can work at two wavelengths simultaneously, for example, 0.87 micrometers due to the gallium arsenide and 1.06 micrometers due to a doping with neodymium. The dopant rare earth may also be erbium for example.

To make lasers in the ultraviolet region, the materials used for the active Bragg reflector may be group II-VI compounds (such as zinc or cadmium selenides, cadmium tellurides and zinc or cadmium sulphides).

Lasers not dangerous to the eye (in the region of 1.5 micrometers) may also be made in this way by using the erbium ion as the active ion of the main laser and alternations of GaInAs and InP (gallium-indium arsenide and indium phosphide) as the semiconductor layers of the Bragg reflector. The main laser may also be a neodymium doped YAG laser, the emission of which is translated towards the longer wavelengths by stimulated Raman effect.

The solid YAG lasers working at two micrometers may also be controlled, according to the invention, by means of a surface emission semiconductor laser using GaInAsSb/AlGaAsSb compounds, the active ion of the main laser being the trivalent holmium ion ($Ho^{3+}$).

Finally, the emission at 1.064 of a neodymium-doped YAG may be controlled by means of a stacking of layers of the $In_{x1}Ga_{1-x1}As/Al_{x2}Ga_{1-x2}As$ type.

For layers formed by materials of the $In_xGa_{1-x}As$/GaAs type, at ambient temperature, the forbidden band energy is governed by the approximate empirical relationship:

$$Eg = 1.424 - 1.615x + 0.555x^2$$

The indium composition appropriate to making a Bragg mirror according to the invention is dictated by the spectral position of the emission of fluorescence of the trivalent neodymium active ion. The mirror taken will preferably be one formed by layers of $In_{0.17}Ga_{0.83}As$ alternating with layers of GaAs.

What is claimed is:

1. A laser including an amplifier medium, a pumping source to excite said amplifier medium and produce fluorescence photons, and two mirrors defining a cavity containing said amplifier medium, wherein at least one of the mirrors is an active mirror producing light at a determined wavelength in response to an excitation by said fluorescence photons of said amplifier medium.

2. A laser according to claim 1, wherein:
   a) said active mirror is a Bragg reflector constituted by a repeated stacking of alternating layers with different optic indices and with thicknesses chosen so as to ensure a peak of reflectivity perpendicularly to said mirror, for a wavelength substantially equal to said determined laser emission wavelength, and
   b) at least one of said layers of said alternation is a semiconductor layer having a radiative transition energy corresponding substantially to said determined laser emission wavelength, and a forbidden band energy that is lower than or equal to the energy of said fluorescence photons so that said layer absorbs a part of the fluorescence photons emitted by said amplifier medium.

3. A laser according to claim 2, wherein said alternating layers comprise two layers and said two layers of the alternation are semiconductor layers, the second layer having a forbidden band energy that is higher than the energy of the fluorescence photons for at least a part of the photons that can be absorbed by the first layer, so as to be transparent for these photons.

4. A laser according to one of the claims 2 and 3, wherein said semiconductor layer or layers is/are homogeneous.

5. A laser according to one of the claims 2 and 3, wherein said semiconductor layer or layers are layers with multiple quantum wells.

6. A laser according to claim 2, wherein another of said layers of said alternation is dielectric and transparent for at least a part of the photons that can be absorbed by the first layer.

7. A laser according to claim 2, wherein the layers are compounds based on gallium arsenide.

8. A laser according to claim 7, wherein one of the layers contains aluminium or indium or antimony.

9. A laser according to claim 2, wherein the second layer is a calcium-strontium fluoride.

10. A laser according to claim 2, wherein said at least one of said semiconductor layers is a II-VI compound.

11. A laser according to any of the claims 1-3 wherein the amplifier medium is a titanium doped sapphire.

12. A laser according to any of the claims 1-3 wherein the active mirror includes different regions having peaks of reflectivity at different wavelengths.

13. A laser according to any of the claims 1-3 including a cavity provided with two standard mirrors and a semi-reflecting separator plate to send on a part of the fluorescence photons, emitted by the amplifier medium, to the active mirror.

14. A laser according to claim 2 wherein said repeated stacking is a stack of approximately 20-30 alternating layers.

15. A laser according to claim 2, wherein said alternating layers each comprise three different layers, at least one of which is a layer of semiconductive material.

16. A laser according to claim 10, wherein said at least said semiconductive layers is selected from the group consisting of ZnSe, CdTe, ZnZS, CdS, CdSe.

* * * * *